Jan. 18, 1966     L. BERNER ETAL     3,229,920
MATERIAL HANDLING APPARATUS FOR PULVERULENT MATERIALS
Filed July 16, 1962     12 Sheets-Sheet 3

INVENTORS
LEO BERNER
IRVING A. EDWARDS
BY
ATTORNEY

INVENTORS
LEO BERNER
IRVING A. EDWARDS
BY
*D. Gordon Angus*
ATTORNEY

INVENTORS
LEO BERNER
IRVING A. EDWARDS
BY

ATTORNEY

Jan. 18, 1966   L. BERNER ETAL   3,229,920
MATERIAL HANDLING APPARATUS FOR PULVERULENT MATERIALS
Filed July 16, 1962   12 Sheets-Sheet 8

Fig-11-

INVENTORS
LEO BERNER
IRVING A. EDWARDS
BY
ATTORNEY

Jan. 18, 1966    L. BERNER ETAL    3,229,920
MATERIAL HANDLING APPARATUS FOR PULVERULENT MATERIALS
Filed July 16, 1962    12 Sheets-Sheet 11

INVENTORS
LEO BERNER
IRVING A. EDWARDS
BY
O. Gordon Angus
ATTORNEY

Jan. 18, 1966     L. BERNER ETAL     3,229,920

MATERIAL HANDLING APPARATUS FOR PULVERULENT MATERIALS

Filed July 16, 1962     12 Sheets-Sheet 12

Fig-15-

INVENTORS
LEO BERNER
IRVING A. EDWARDS
BY
ATTORNEY

United States Patent Office 3,229,920
Patented Jan. 18, 1966

1

3,229,920
MATERIAL HANDLING APPARATUS FOR
PULVERULENT MATERIALS
Leo Berner, Pasadena, and Irving A. Edwards, Glendora,
Calif., assignors to Aerojet-General Corporation, Azusa,
Calif., a corporation of Ohio
Filed July 16, 1962, Ser. No. 211,939
3 Claims. (Cl. 241—158)

This invention relates to integrated equipment for the handling of pulverulent materials and provides for the treatment of such material from the delivery of the material in containers such as barrels to the equipment, the emptying of the barrels by upending and jolting them if necessary and passing the barrel contents to means breaking up the material received from the barrels, reducing it to size and blending it for drying and collection in a suitable equipment, when drying is required.

The equipment may be utilized in a wide variety of chemical manufacturing and material handling processes. It is an object of the invention to provide integrated equipment by which the required output of material handled and delivered in the condition required may be achieved for a fraction of the labor costs previously incurred.

Another object of the invention is to provide equipment of the kind described which is largely automatic in action and provides a greatly increased output to be obtained.

A further object of the invention is to provide equipment which may be safely used for processing materials of a dangerous or explosive character.

Another object of the invention is to provide a barrel lift of simple and rugged construction having individual controls and driving means and so arranged that power is used only while operation of the lift is required, the controls being arranged so that an operator may lift individual barrels, a batch of them at a time, or operate the barrel lift continuously, each barrel being positively pushed onto the track receiving the barrels from the lift.

Yet a further object of this invention is to provide a chain hoist for lifting heavy loads which is designed so that the forces on the chain are directed only along the path followed by the chain.

Another object of the invention is to provide a barrel hoist with feed and delivery tracks arranged to insure that the last barrel to be raised in any operation will be delivered to the track receiving the barrels and pushed thereon, thus insuring that no barrel remains on the hoist, thus avoiding the risk of a barrel backing down the hoist when the use of the latter is discontinued, and causing damage on the loading floor.

A further object of the invention is to provide means for delivering the full barrels to mechanism automatically, first tilting the barrels cover end up to enable the covers to be removed, then upending the barrels to empty them, jolting them if necessary to break out set up lumps and returning them to horizontal position for removal to means automatically disposing of the empty barrels.

A further object of the invention is to provide lump breaking mechanism which is entirely enclosed and will rapidly break the material delivered from the barrels and regardless of the size of the lumps without crumbling the material into dust any small amount occurring being prevented from leaving the breaker enclosure and drawn off to filtering apparatus.

Still further objects and features of the invention will herein appear from the following specification and illustrative drawings describing a preferred embodiment of the invention.

With the above and other objects in view, the invention comprises integrated equipment including means for hoisting full barrels automatically onto an elevated track

2 and positively pushing the barrels onto said track, feeding them under control of the operator one at a time to means for tilting the barrels to enable the lids to be removed, upending them over a lump breaker mechanism, jolting them if necessary for any period of time required, and a descender for empty barrels, said descender working solely by gravity, the lump breaker being effective to break up lumps of any size to a predetermined minimum size and means for delivering ground material to any selected bin.

Figure 1:
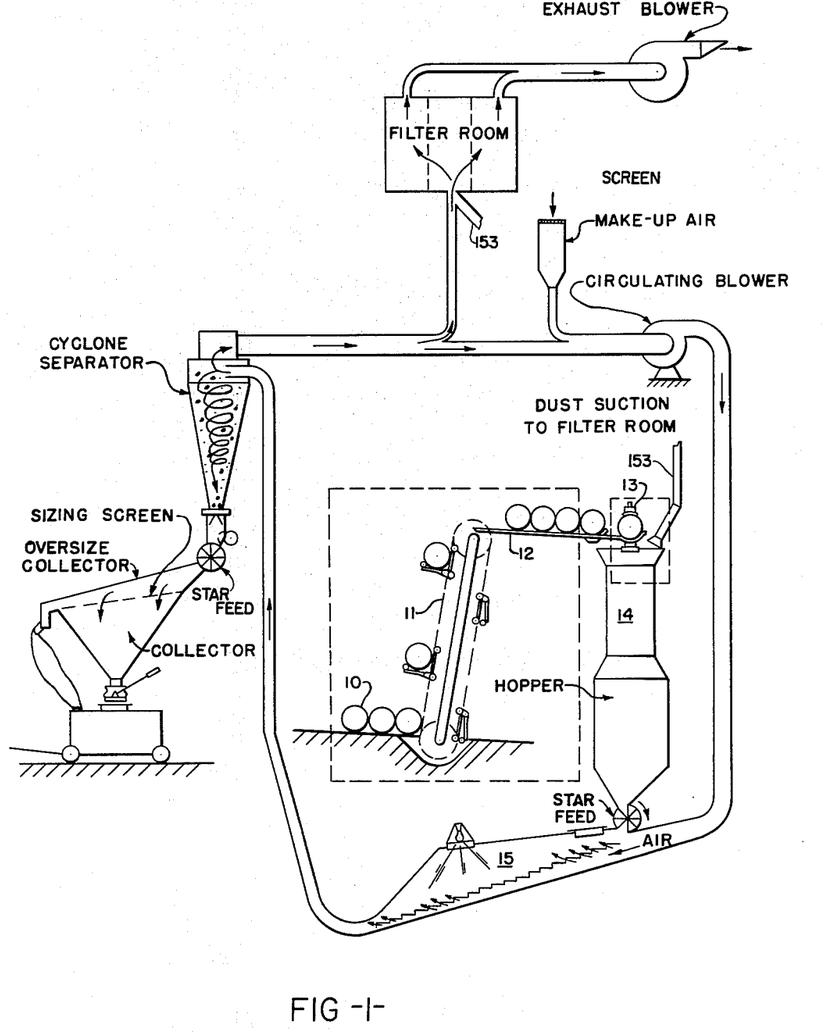
FIGURE 1 is a schematic showing the general arrangement of the equipment of the invention.

Referring now to FIGURE 1, the equipment as arranged to receive barrels 10, raises them by the barrel hoist 11 to an elevated track 12 from which they roll to barrel dumping and jolting apparatus 13 and lump breaking means 14. From the lump breaker, the material passes through blending and novel adjustable rate feed equipment to a suitable drying arrangement 15. The particular drying equipment is no part of the present invention, and any suitable arrangement may be used. An arrangement suitable for use is that shown in U.S. Patent 2,929,152 issued March 22, 1960. The drying arrangement 15 is shown in outline form as comprising a step construction as covered by said U.S. Patent 2,929,152, down the incline of which the material from the hopper to be dried, passes. The step arrangement is situated in the air conduit and air blows through openings or holes in the steps to create the drying action while it carries the material along the air conduit.

The various pieces of equipment identified by legends in FIGURE 1 are included to show a complete installation but the subject matter of this application is restricted to the novel construction and co-operative arrangement of the barrel hoist 11, barrel dumping and jolting apparatus 13 and lump breaking, blending and feeding device 14 which will now be specially described in that order.

BARREL HOIST

Figure 2:
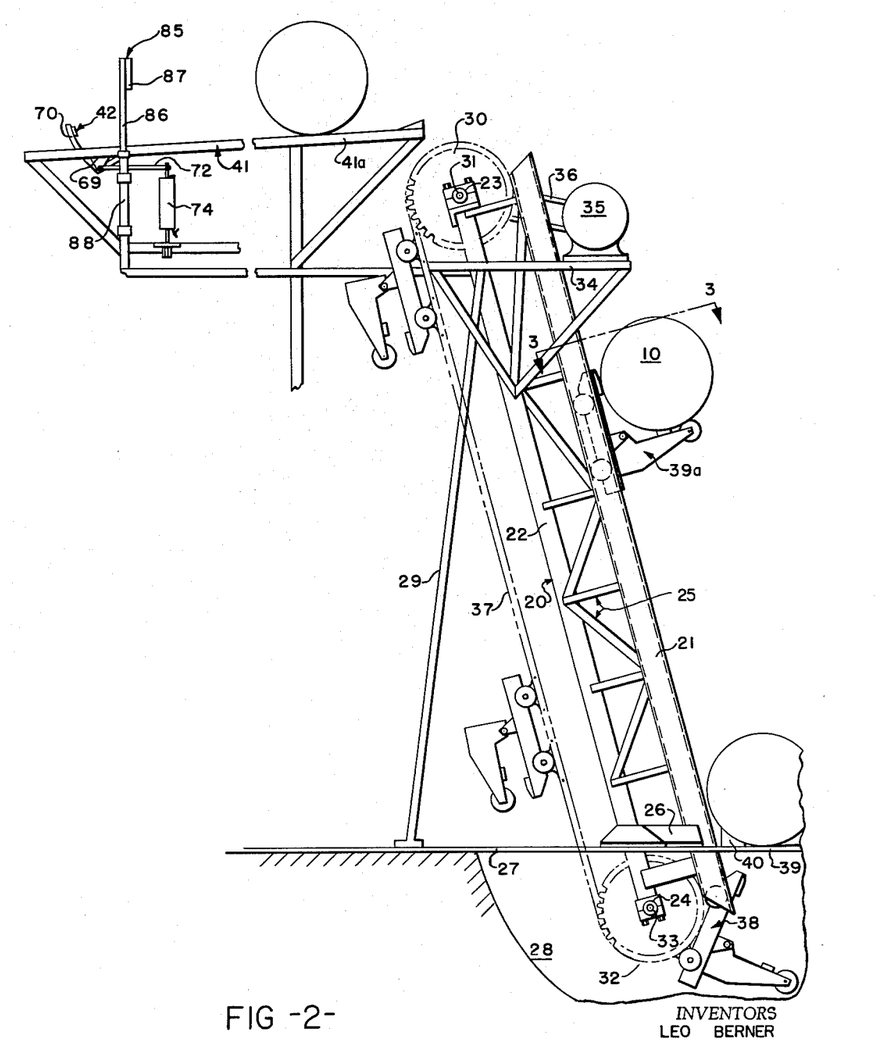
FIGURE 2 is a side elevation of the barrel lift and delivery track.

Referring now to FIGURES 2 through 5, the hoist structure which is generally indicated in FIGURE 2 by the numeral 20, comprises channel shaped front longitudinal frame members 21 with their open sides facing toward one another, and L section rear longitudinal frame members 22. The flanges 21a and 21b of the frame members 21 serve as first and second parallel guide surfaces in a manner to become apparent below. A top chain sprocket wheel bearing 23 is mounted at the upper end of the rear frame member, and a bottom chain sprocket bearing 24 at the lower end of the rear frame member. The front and rear longitudinal frame members are braced into a rigid structure by bracing indicated at 25. The foot of the hoist is supported by brackets 26 welded to the frame members and supporting the structure on floor 27 along the edges of a pit 28 into which the lower end of the longitudinal frame projects. The upper end of the hoist structure may be braced from the floor by back struts 29.

A top chain sprocket 30 is secured on a shaft 31 mounted in bearings 23, and a bottom chain sprocket 32 is mounted on a shaft 33 mounted in bearings 24. A platform 34 is mounted toward the upper end of the hoist on which a motor 35 is located, which drives the chain sprocket 30 through a drive chain 36.

A conveyor chain 37 is mounted on the top and bottom chain sprockets 30 and 32 and a plurality of carriages 38 are connected at intervals to the chain 37.

The carriages 38 are each provided with load carrying arms and are of novel construction, as will later be specifically described.

The barrels 10 preferably roll down a track 39 slightly inclined toward the foot of the barrel hoist, being brought to rest in position to be raised by the arms, generally indicated at 39a of the carriages 38 by a stop 40, and the barrels are delivered by the hoist to an upper track 41 slightly inclined away from the top the hoist. The barrels are released from said upper track by a stop 42 later described in connection with subsequent operations on the barrels and their contents.

The pit 28 is formed with a curved back bottom and front wall continuous surface, as indicated in FIGURES 1 and 2, which acts to guide the load carrying arms of the carriages from the return position into lifting position with a minimum depth of the pit.

Figure 3:
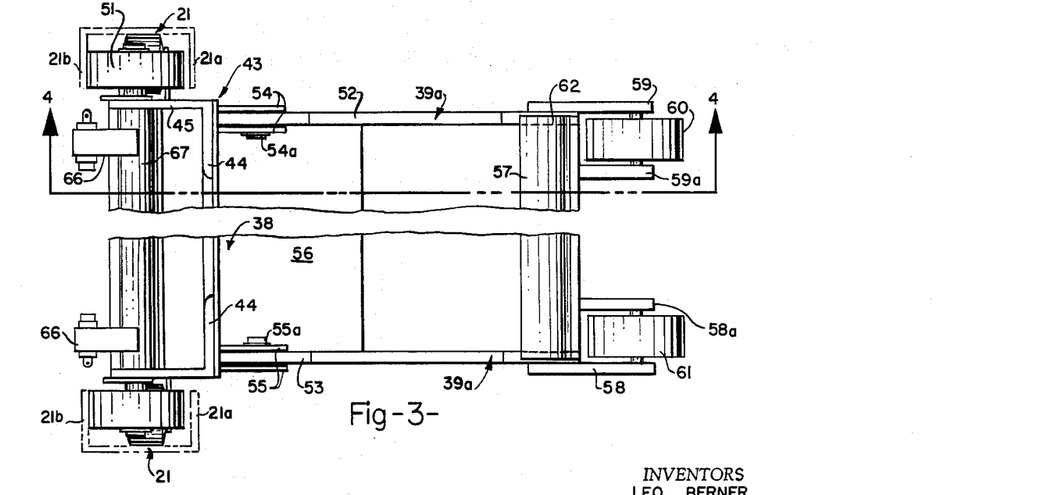
FIGURE 3 is a top plan view of one of the barrel raising elements included in the barrel lift.
Figure 4:
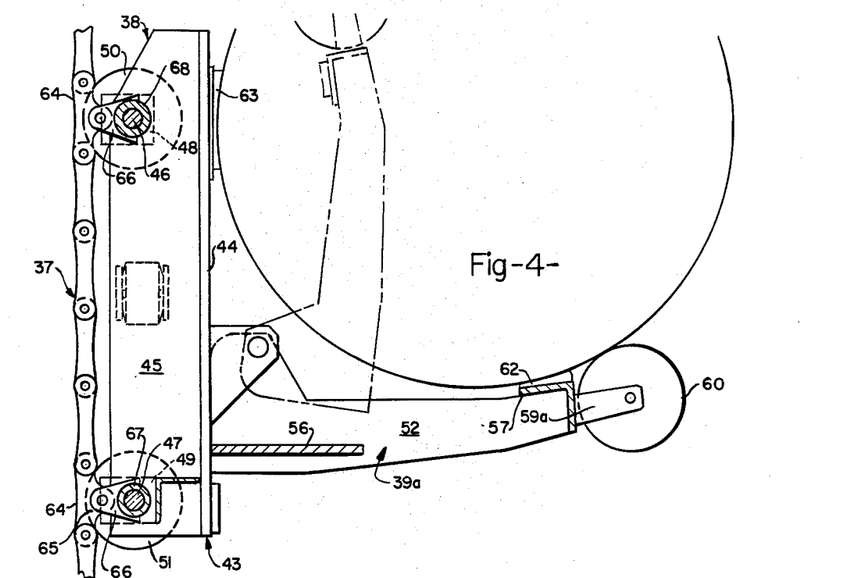
FIGURE 4 is a section on the line 4—4 in FIGURE 3.

Referring now to FIGURES 3 and 4, carriages 38 are formed with a base member, generally indicated at 43, having a top plate 44 with flanges 45 extending toward the hoist and having a front shaft 46 and back shaft 47 extending below the top plate 44 and mounted in blocks 48 and 49 welded to the flanges to form bearings for the ends of the shafts. Roller wheels 50 and 51 are mounted on the ends of shafts 46 and 47 respectively on the outside of the flanges 45 within the channel members 21 of the hoist frame. With this arrangement, the roller wheels are positioned so their axes are in a plane parallel to the plane of the track defined by the frame members 21. If the carriages 38 are under a load which would otherwise exert an eccentric moment on the chain, the upper wheels will bear against the front flanges 21a of the frame members and the wheels 51 will bear against the rear flanges 21b. With this arrangement, the eccentric moment on the carriages is carried by the channel members 21 instead of the chain. Consequently, all the forces in the chain are directed along the path of the chain. This substantially minimizes load and wear on the chain.

A pair of load bearing arms 39a are mounted on carriages 38 and extend outwardly and generally transverse to the track frame. These arms are pivoted between pairs of mounting plates 54, 55 welded at opposite sides of top plate 44 on pivots 54a, 55a. The mounting plates 54, 55 are located toward the lower end of the plate 44 when in vertical position.

The arms 39a comprise wide base portions 52, 53 which abut plate 44 when the arms are extended normal to plate 44, and the base portions are connected by a heavy stiffening plate 56, while the outer ends of the arms are connected by an angle bar 57.

The arms 39a are extended by plates 58, 59 welded to the outer sides of the arms, and plates 58a, 59a are welded to the downturned flange of the angle bar 57, the pairs of plates 58, 58a and 59, 59a providing bearings for the shafts of load supporting and delivering rollers 60, 61.

A load carrying pad 62 is secured to the horizontal flange of angle bar 57 and a second pad 63 is secured across the upper portion (when in raising position) of plate 44.

The carriages are secured to the chain 37 which is provided with special links 64 provided with drilled lugs 65 which are connected to drilled lugs 66 welded to tubes 67, 68 rotatably mounted on the shafts 46, 47.

Figures 5, 6:
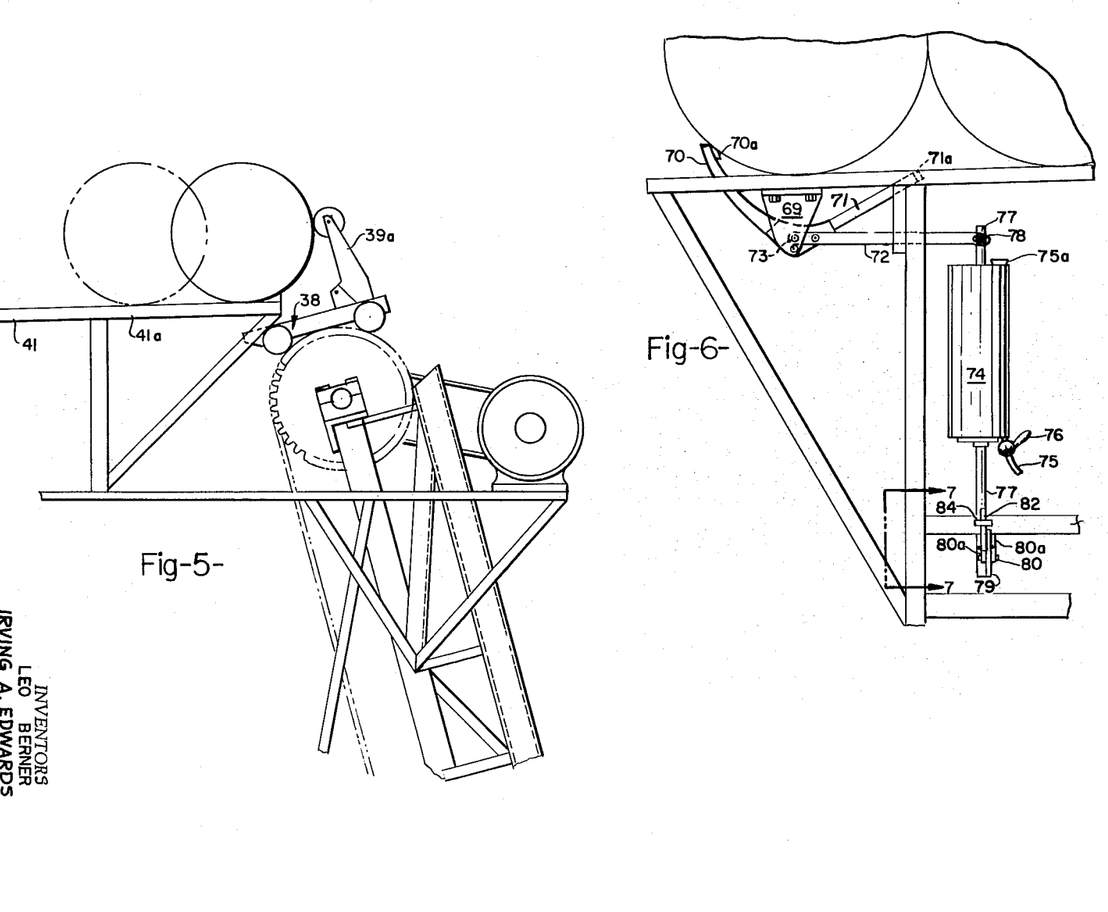
FIGURE 5 is a fragmentary view on a larger scale of the top of the mechanism shown in FIGURE 2, showing barrels being pushed onto a delivery track from which they are fed to the dumping and jolting device.
FIGURE 6 is a fragmentary detail view of a foot operated device for feeding barrels one at a time from the track shown in FIGURE 5 to dumping and jolting apparatus.

The arms 39a of the carriages 38 raise the barrels onto the end of the track 41 and positively push them along the track for a distance as indicated by the position of the barrel shown in FIGURE 5, the end 41a of the track being outriggered to enable the barrels to be received thereon and permit the carriages and arms to pass downward through the open end of the track.

It will be noted that the arms 39a after leaving the raised barrel will hang vertically in substantial parallelism with the return run of the chain 37 and thus occupy a minimum of space. The arms assume their operative position guided by the curved pit bottom, as indicated in FIGURES 1 and 2, under the action of gravity as they commence their upward movement.

Figure 7:
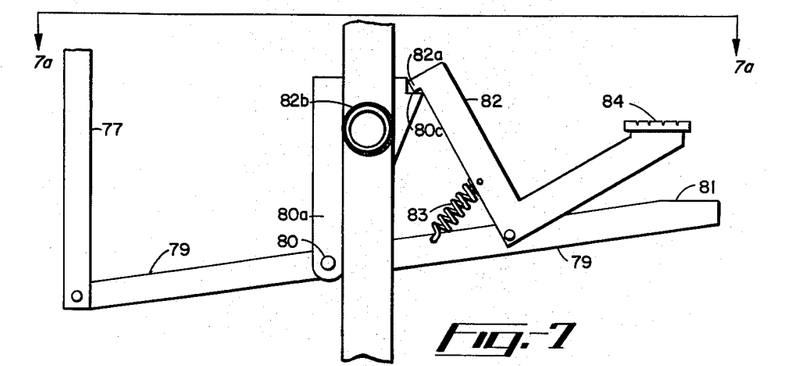
FIGURE 7 is a fragmentary detail view of a foot controlled detent fitted to the device taken on the line 7—7 in FIGURE 6.
Figure 7A:
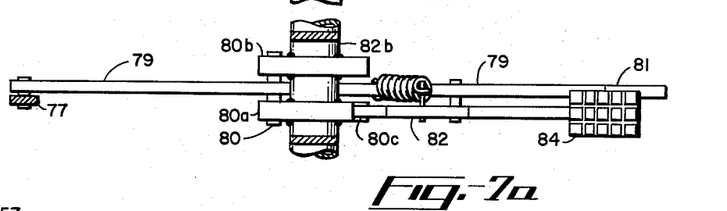
FIGURE 7a is a plan view of the apparatus shown in FIGURE 7 taken along the line 7a—7a in FIGURE 7 and looking in the direction of the arrows.

Referring now to FIGURES 6 and 7, the stop 42 provided on the track 41 to arrest the barrels and feed them one at a time to equipment operating subsequently on them comprises a shaft 73 pivoted on brackets 69 mounted below the track 41 and having two arms 70, 71 at the inner sides of the track, in the form of longitudinal side members welded to the shaft with bars 70a and 71a extending between the opposite arms. An operating arm 72 is welded to shaft 73 and extends under the track. A weight 74 is provided which may be in the form of a tank into which water may be introduced through a filler plug 75a and run out through spout 75 controlled (see FIGURE 6) by tap 76 so the weight may be adjusted to operate with a series of barrels of different weights. The weight 74 is suspended from the bar 72 by a vertical rod 77 passing through the weight 74 and connected to the bar 72 by a pin 78. Rod 77 extends downwardly and is pivotally connected to a treadle bar 79 (FIGURE 7). Bar 79 is pivoted at 80 between plates 80a and 80b, which are welded to a frame member 82b (see FIGURE 7a). As seen, plate 80a has a portion 80c adjacent a spring held cranked detent 82 pivoted on the treadle bar 79. The detent is provided with a catch 82a on one arm of the detent which is pulled downwardly toward the bar 79 by a spring 83. The other arm of the detent 82 is furnished with a foot plate 84 which overlies but is spaced from the end 81 of the bar 79. When bar 70a is contacted by the barrel, this moves catch 82a downwardly into engagement with portion 80c, thus providing a positive stop for the first barrel until an operator depresses the foot plate 84. This releases the catch 82a and exerts a downward pressure on the end 71 of arm 79 (see FIGURE 7). This action releases the first barrel for rolling by gravity into the barrel dumper and at the same time stops the next barrel against stop bar 71a on arm 71. After the first barrel has rolled off the track 41, the operator removes his foot from plate 84. The weight 74 now lowers stop arm 71 and raises arm 70, permitting the barrel previously stopped by stop bar 71a and all barrels behind it to roll down the inclined track 41 until stopped by raised stop bar 70a engaging the leading barrel.

The barrels may be raised one at a time for an indefinite period provided that they are continuously delivered to the barrel hoist, but it is often required to deliver only a certain number of barrels in a batch.

On the upper track 41, a removable safety stop 85 (FIGURE 2) is provided in front of the release stop 42 which comprises side standards 86 connected to a wide bar 87 toward the top of the standards at a height to be engaged by the barrels. The standards are fitted into sockets 88 mounted on frame members at the sides of the track which is inclined as shown in FIGURE 2. When the barrel hoist is put into operation to raise a batch of barrels, in contra-distinction to a continuous supply of barrels, the barrels in the batch roll down the track and stop against the safety stop 85; when the whole batch has accumulated, the safety stop is manually lifted out of the sockets 88 and the barrels thereafter are passed one at a time by the release stop 42 to the dumping and jolting mechanism now to be described.

Figure 8:
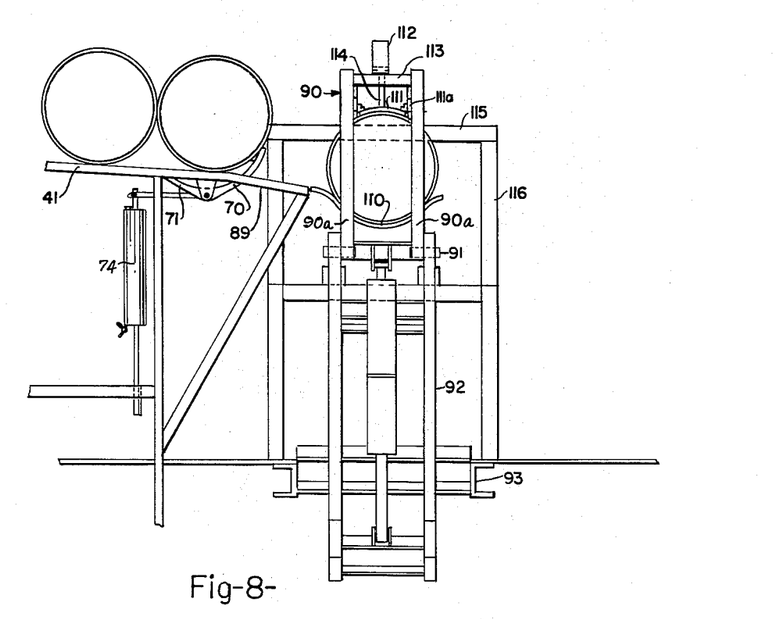
FIGURE 8 is a fragmentary view of the end of the track shown in FIGURE 5, and a barrel dumping and jolting device to which the barrels are delivered, one barrel being shown in the device while the barrel next to it is stopped by a foot operated device from forward movement.
Figure 9:
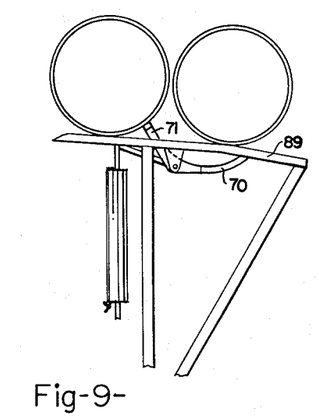
FIGURE 9 is a fragmentary view of the barrel feeding device shown in FIGURE 8 at the instant the barrel, shown in arrested position in that figure, is released while the barrel following it is arrested.

Referring now to FIGURES 8 and 9, the terminal portion 89 of track 41 is inclined toward a barrel receiving frame 90 which is pivoted at 91 to the outer end of a two-armed crank shaped jolter frame 92, the opposite ends of the arms of which are pivotally secured as at 92a (FIGURE 10) to a frame member 93 of the machinery support.

The construction of the dumping and jolting mechanism is shown in detail in FIGURES 10 through 13, FIGURE 10 showing outer ends of the jolter frame arms supported when in barrel receiving position by struts 94 extending upwardly from support 93.

Figure 10:
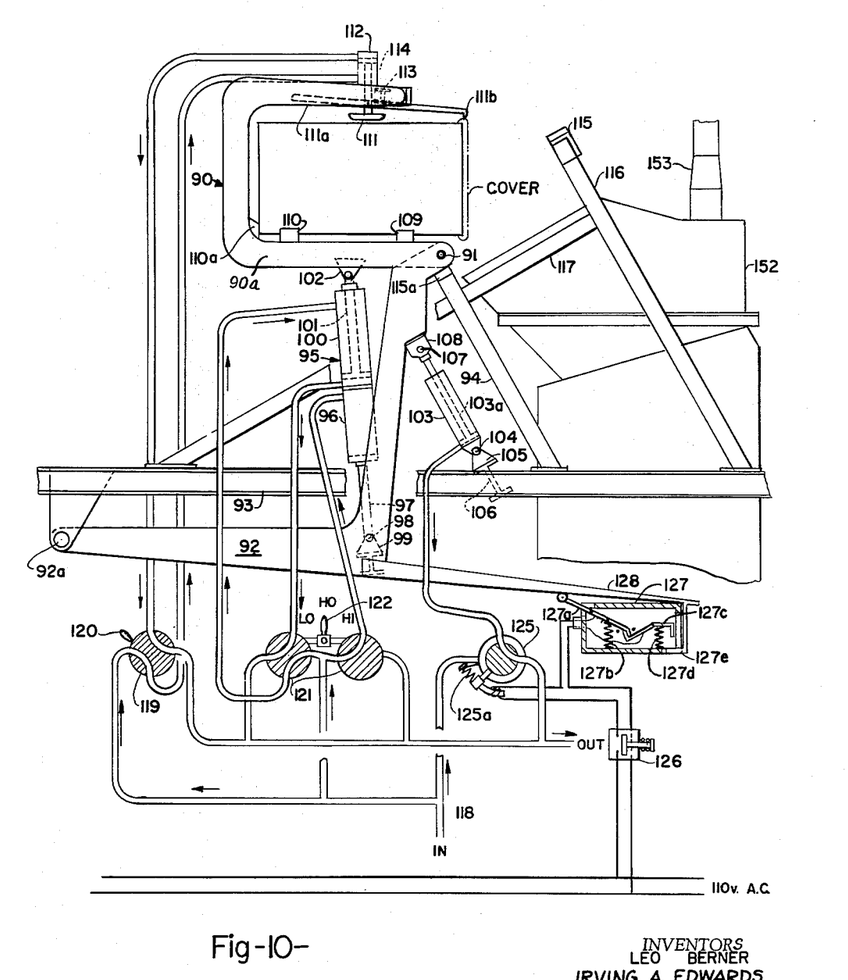
FIGURE 10 is a side view relative to FIGURE 8 showing the barrel engaged by the dumping and jolting device and before the operation thereof, the direction of flow of operating fluid being schematically indicated.

The barrel receiving frame 90 comprises a pair of U-shaped arms 90a swung about pivots 91 through a wide range of movement by a compound cylinder and piston member generally indicated at 95. This member comprises a single acting cylinder 96 containing a piston, the piston rod 97 of which is pivoted at 98 to a bracket mounted on a cross-member 99 extending between the lower arms of the crank shaped jolter frame 92.

A double acting cylinder 100 is secured to and above cylinder 96 and contains piston rod 101 which is pivotally attached to a bracket 102 welded to the barrel receiving frame 90.

A single acting jolting cylinder 103 is pivotally connected at 104 to a bracket 105 mounted on a cross beam 106 and the piston rod 103a connected to the piston is pivotally connected at 107 to a bracket 108 mounted on the jolter frame 92.

The barrel is brought to an inverted position to dump the contents, and to hold it in the barrel receiving frame 90, the latter is provided with a pair of transverse curved saddle members or supports 109, 110 (FIGURES 8 and 11) engaging the lower side of the barrel and with a curved upper clamp shoe 111 engaging the upper side of the barrel at a point intermediate the location of the lower supports. The upper clamp is pressed against the barrel by means of a double acting cylinder 112 mounted on a cross member 113 of the barrel receiving frame, the piston rod 114 working in the cylinder being connected to the clamp shoe 111. Since the barrels have to be held while in inverted position and violently jolted by impacting the end of the arms of the barrel receiving frame against bumpers, it is preferred to provide an additional locking means which is engaged over the edge of the open end of the barrel after the barrel cover is removed to prevent longitudinal slippage of the barrel. A positioning stop 110a is provided at the lower inside corners of the U-shaped arms of the barrel jolting frame to insure that the barrels are correctly positioned to be engaged by the edge locking means.

As shown in FIGURE 10, the edge locking means comprises a pair of arms pivoted toward the back of the upper arms of the barrel receiving frame 90 and which are pivotally connected intermediate their length to lugs welded to clamp shoe 111 and are thus engaged simultaneously with the clamp shoe 111. The outer ends of the arms of the edge lock arms 111a are welded to a curved L-shaped member 111b, the flange of which engages over the edge of the barrel.

If necessary, the inverted barrel receiving frame may be jolted against bumpers 115 carried on struts 116 mounted at their lower ends on support members 93 and bumpers 115a on the upper ends of struts 94. The upper ends of the struts 94 and 116 are braced by cross frame members 117 connected to the upper ends of the struts and sloping downward.

The means supplying pressure to the various cylinders is shown as air under pressure although hydraulic pressure could be used to operate the cylinders.

The pressure air supply line is shown at 118 from which branch pressure lines lead to a four-way valve 119 controlling the clamp cylinder 112; the valve is manually operated by handle 120.

The tilt cylinder mechanism 95 is operated by a double-barrel four-way valve 121, operated by a handle 122.

The jolt cylinder 103 is operated by a solenoid controlled by two-way valve 125 which is normally held by tension spring 125a in position to connect the jolt cylinder to the air return line but manually operable by a push button switch 126 together with a switch 127 automatically operated by an arm 128 projecting from the jolter frame 92 to bring the jolt cylinder into operation.

The automatically operating switch 127 may be of any suitable arrangement, the parts shown in FIGURES 10–13 illustrating a pair of pivoted levers (actually arranged outside a switch housing and operating contacts within the housing mounted on the pivots of the levers; the arrangement shown is therefore diagrammatic) serving also as contact members. One lever 127a is provided with a roller and is rocked downwardly against the effort of a tension spring 127b as arm 128 approaches its lower position but maintains contact with the second lever 127c because of the action of a second tension spring 127d, until a downwardly extending hooked finger 127e mounted on the end of arm 128 and underlying the tail of lever 127c moves lever 127c out of contact with lever 127a against the force of spring 127d.

Figure 12:
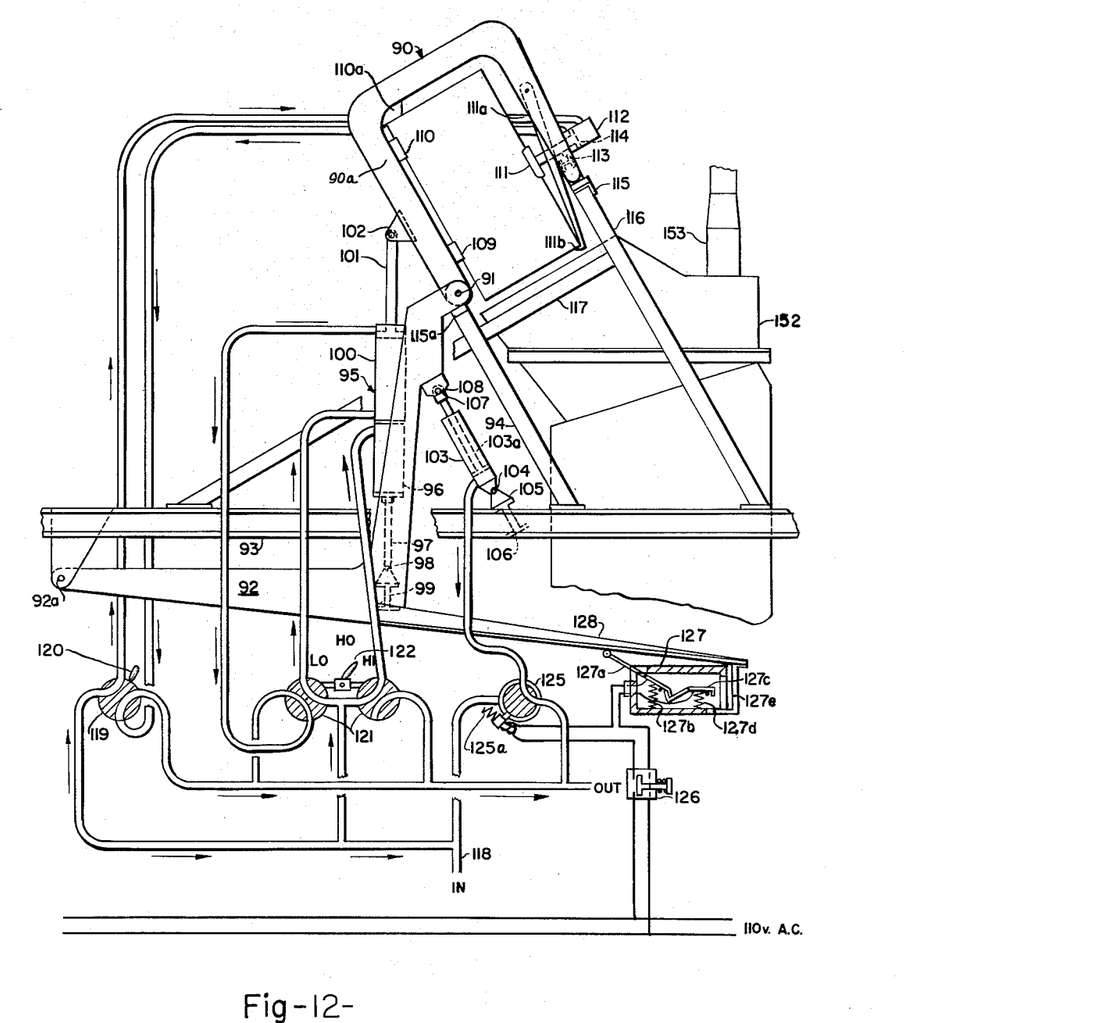
FIGURE 12 is a view similar to that of FIGURE 11 but showing the barrel raised and upended for dumping in the movement of the device following that shown in FIGURE 11.
Figure 13:
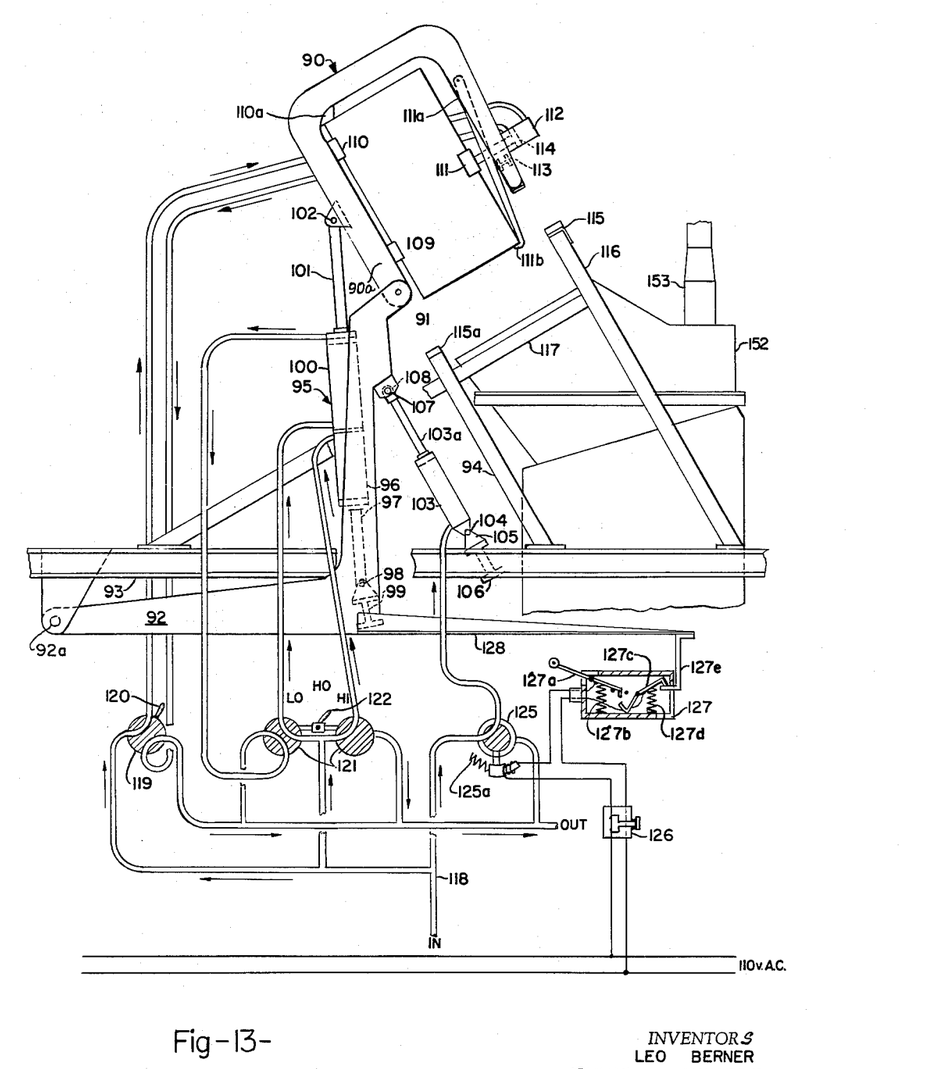
FIGURE 13 is a view similar to FIGURE 12 but showing jolting mechanism in operation.

As shown in FIGURE 13, in which the push button switch 126 is shown closed, the switch 127 has just been operated to interrupt the circuit through solenoid valve 125; this valve will therefore when again actuated be moved against the effort of spring 125a to the position shown in FIGURE 12 in which, toward the end of the downward movement of arm 128, the circuit through the switch 127 is completed and, providing push button switch 126 is kept closed, the solenoid of valve 125 again connects jolting cylinder 103 to the air pressure line and the jolting frame is moved to the raised position, the contacts of switch 127 being maintained during this movement until finger 127e again breaks the circuit, allowing the jolting frame to fall by gravity and bump the ends of the arms of the barrel receiving frame against bumpers 115 and 115a.

It is to be noted that the shocks delivered to the side struts 116 by the jolter frame are transmitted through the frame of the equipment directly into the foundations and not to any other components of the apparatus such as the lump breaker.

The barrels when emptied are released from the barrel receiving frame 90 and passed through a window 130 in the adjacent wall onto the empty barrel removal device or descender (FIGURE 14) which comprises a vertical guide framework 131 of channel section material, having two lengths 131a, 131b in parallel relationship and spaced somewhat further apart than the length of the barrels. The vertical guide is spaced from the wall of the building under the window and held in this position by a top strut 132, an intermediate strut 133, and the bottom of the guide frame which is curved inwardly into abutment with the wall.

Figures 14, 14A, 16, 17, 18:
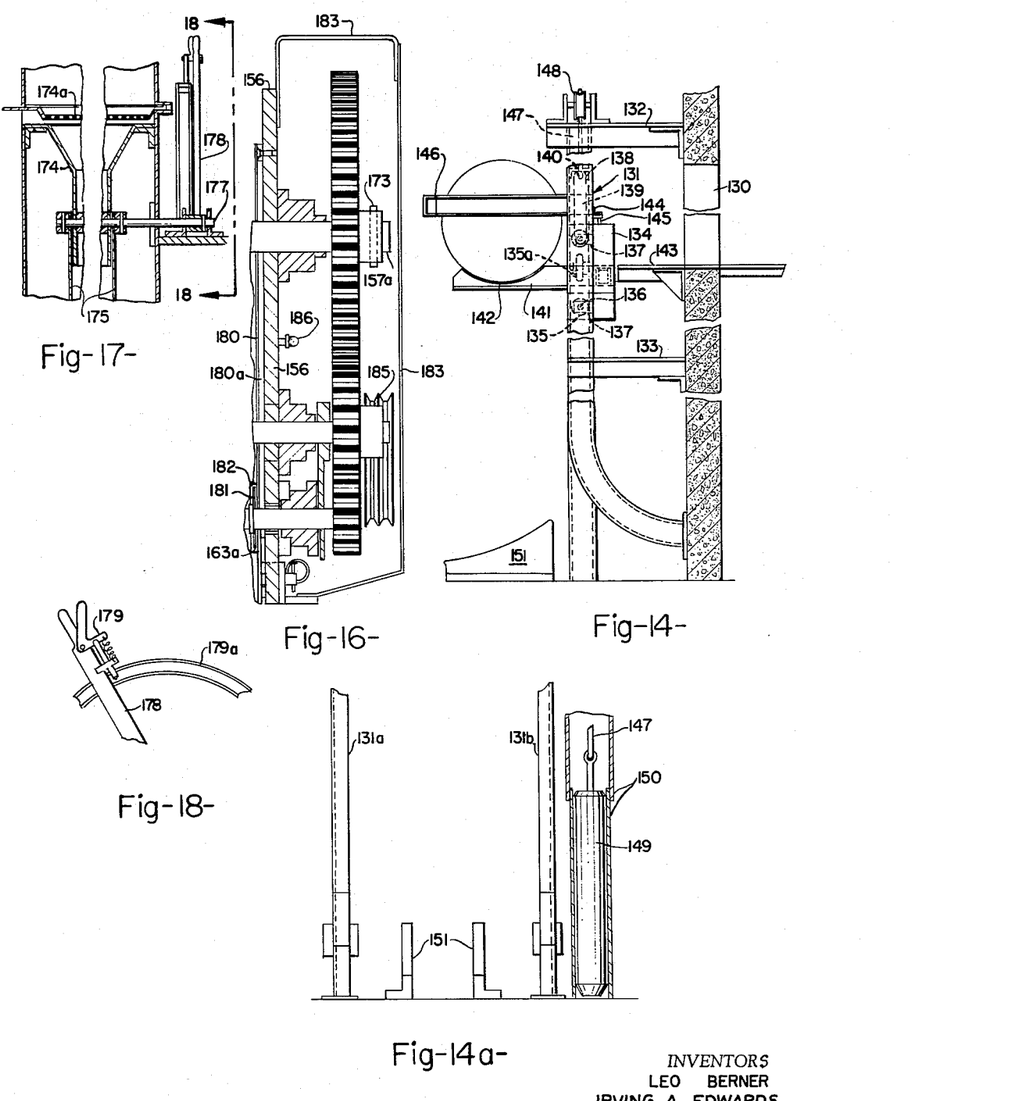
FIGURE 14 is a view in side elevation of a descender for emptied containers.
FIGURE 14a is a fragmentary front elevation of the descender.
FIGURE 16 is a fragmentary view of a casing enclosing the driving shaft bearings of the lump breaker.
FIGURE 17 is a fragmentary section on the line 17—17 in FIGURE 15 drawn on a larger scale.
FIGURE 18 is a detail view of the operating lever shown in FIGURE 17 looking in the direction of the arrows 18—18 in that figure.

A small trolley 134 is guided for movement vertically in the two vertical members 131a, 131b by small wheels 135 running against the front and rear flanges of the channels and a pair of wheels 135a mounted on opposite sides of the trolley and running against the web of the channel. The wheels are mounted on stub shafts 136 projecting from short forwardly projecting arms 137 welded to the side frame of the trolley 134.

The trolley is connected in a hoisting frame comprising a rigid cross bar 138 and depending side links 139 welded to the transverse bar at their upper ends but pivotally connected at their lower ends to the trolley. Small wheels 140 are mounted at the upper corners of the frame. The wheels run on the inside of the flanges of the channel members and insure smooth running of the trolley.

The trolley 134 is provided with track arms 141 of angle material extending outwardly of the face of the vertical guide and curved barrel fitting strips 142 fitted in and welded to shallow cutouts in the upper edges of the outer ends of the arms. A short length of track 143 is arranged extending over the sill of the window to adjacent the carriage supported arms. The trolley is arrested at a height aligning the tracks on the trolley and on the sill of the window by a stop comprising a bracket 144 welded to the vertical frame and fitted with an adjustable bolt 145, the head of which abuts the top of the trolley 134 at the required position. A horizontal bumper bar 146 is mounted on the framework 131 to prevent empty barrels from running off the trolley supported arms.

The hoisting frame transverse bar 138 is connected to a cable 147 which is passed over a sheave 148 and connected to a cylindrical counterweight 149 guided in a tube 150 extending along and supported by a vertical frame member 131.

The lower end of tube 150 has a reduced diameter for a close fit with the counterweight. The counterweight is of a weight somewhat less than that of the carriage loaded with an empty barrel, causing the barrel to be slowly lowered, but the empty carriage would be hoisted fast enough to be stopped with an unnecessary shock but for the close fit between the counterweight and tube at the lower end of the latter which provides a dashpot effect bringing the carriage gently against stop 145.

The trolley 134 can follow the curved lower end of the track sufficiently far to tilt the track arms enough to cause the empty barrels to roll off onto the inclined ramp 151 from which they roll onto the floor of the empty barrel storage room.

The operation of the parts so far described will be later explained.

The mechanism of the lump breaking means indicated generally at 14 in FIGURES 1 and 2, will now be described with reference to FIGURE 15.

The lump breaker, designed especially for breaking lumps of fracturable ice-like material such as ammonium perchlorate, is arranged in the housing 14 (FIGURE 1) which comprises an upper part of light metal 152, from which a duct 153 (FIGURES 10-13) for dust drawn by the suction of an exhaust blower, extends upwardly to a filter room (FIGURE 1). The upper part of the housing directly under the barrels brought over it is provided with a ring 154 of a diameter sufficient to pass the largest lump that may drop from the container but too small to allow a barrel or barrel lid accidently dropped from the barrel dumping mechanism to fall through.

The height of the upper portion of the housing is preferably made sufficient to prevent the hand of an operator from being caught by the rotating disks of the breaker.

The upper portion of the housing is mounted on a heavy frame 155 of angle material while the lower portions of the housing are of heavier material with sides 156 of thick steel plate.

A bank of three-pointed toothed disks 157 is mounted on a driving shaft 157a in bearings mounted on the thick side plates 156. The disks 157 are arranged in the spaces between L-shaped flat breaker bars 158 forming a bed for the lumps falling from the upended barrels. The bars are arranged to provide a 90° trough under the descending edges of the counter-clockwise rotated toothed disks 157.

Figure 15:
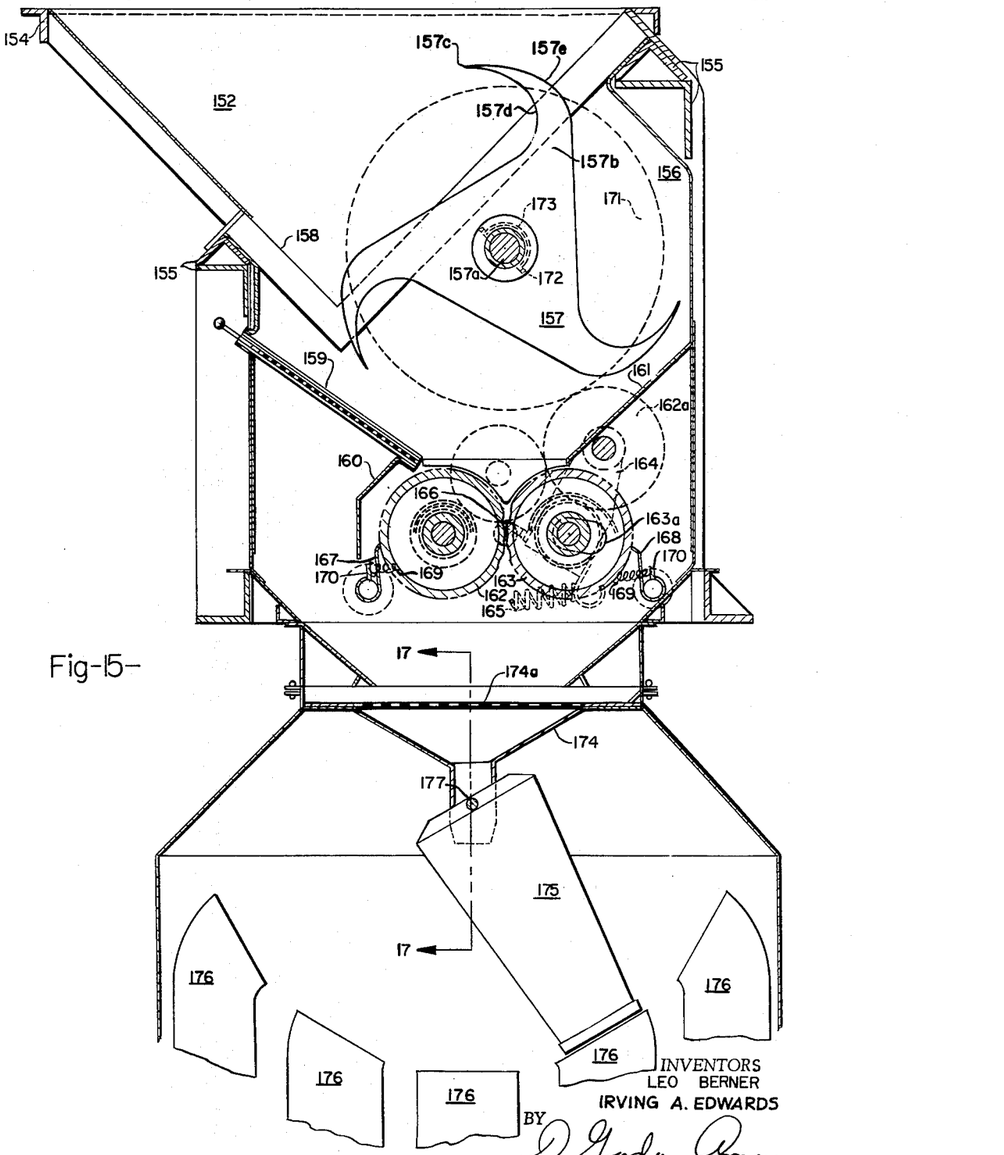
FIGURE 15 is a vertical section through a lump breaking and material delivering and blending component of the apparatus.
Figure 19:
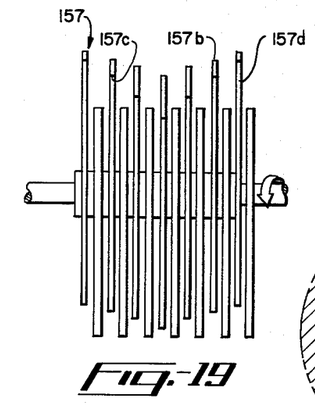
FIGURE 19 is a front view of the bank of disks designed to break up the lumps fed into the lump breaker.

As seen in FIGURES 15 and 19, the bank of disks 157 are each provided with three uniformly angularly spaced teeth 157b. Teeth 157b are generally hook-shaped and terminate in a cutting penetrating point 157c. As best seen in FIGURE 19, points 157c of the teeth 157b are not in a straight line, but instead, they are arranged to successively engage material to be broken, thereby reducing the power necessary to operate the mechanism. In particular, as shown in FIGURE 19, the points 157c of the bank of disks 157 are disposed in generally V-shaped relationship to each other although this particular configuration is not essential.

The operation of the disks is as follows: When a tooth 157b of a disk 157 engages a lump, the concave surface 157d of the tooth 157b exerts a hooking action on a part of the split lump of material, forcing it through the breaker bars 158. The convex surface 157e holds the remaining mass of the lump away from the breaker bars to prevent it from interfering with the cutting and crushing action of the teeth. It is noted, however, that as the disks rotate, the convex surfaces gradually approach and then pass through the spaces between the breaker bars. In this way, the remaining mass of the lump resting on convex surface 157e is gradually moved until it is in a position to be enclosed and cut by the next tooth in the disk. It is apparent that the shape of the disks is effective either to trap and break up the lumps in the angle formed by the breaker bars 158 or to bite into and break up the bottom surface of a large plug of the material.

Figure 20:
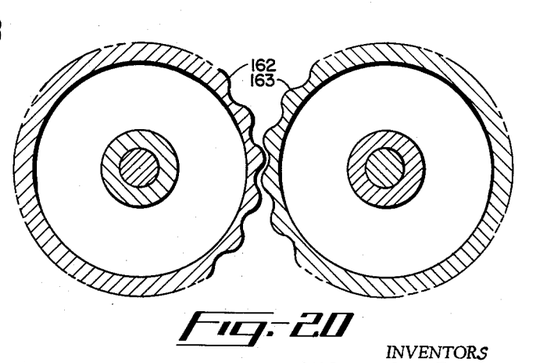
FIGURE 20 is an enlarged sectional view of the pulverizing rolls designed to reduce the broken lumps to a predetermined size.

Plugs of material may be occasionally formed in a barrel by the setting up of the contents due to aging or moisture reaching the contents. An inclined screen 159 is arranged under the bars to receive fragments small enough to pass between the bars; when such fragments are small enough to pass through the meshes of the screen, they are of the grain size desired and are therefore guided by the deflector 160 to the collecting hopper arranged below the housing. Pieces of a size too large to pass through the screen, together with any pieces falling through the bars on the rising side of the tooth disks, are guided by a deflector plate 161 to be fed between the breaking rolls 162, 163, the surfaces of which are not provided with cutting teeth but with a corrugated surface contour maintained a minimum distance apart corresponding to the desired grain size. In addition, the corrugated surface formation of the rolls positively forces material to pass between them. Roll 162 is mounted on a shaft in fixed bearings, but roller 163 is mounted on a shaft carried by swinging links 164 joined on the ends of a shaft of an idler gear 162a which meshes in the gear train driving rolls 162, 163. Links 164 are resiliently drawn toward roller 162 by a helical spring 165 and an adjustable stop 166 is provided to limit the approach of the surface of roll 163 to the surface of roll 162. An arcuate slot 163a is provided in walls 156 to afford clearance to the shaft of roll 163.

Scraper plates 167, 168 are positioned to bear against the rolls 162 and 163 and are secured on shafts which are resiliently acted on by helical springs 169 stretched between pins 170 projecting from the shafts.

The shaft 157a on which the toothed disks are keyed is driven by a gear 171, a shear pin 172 connecting the hub of the gear to the shaft. This pin is grooved to insure a clean break and a split wire ring 173 is passed through holes in the projecting ends of the pin to prevent them from dropping into the driving gears.

The drive gearing is arranged to drive the rolls 162, 163 in opposite directions at the same speed and since the resiliently pressed roll 163 swings about the idler gear 162a, the roll 163 remains in proper mesh with roll 162 when whatever object causing it to swing away from roll 162 has passed through the rolls.

A removable screen 174a of tray-like configuration is provided below the reducing rolls 162, and 163, in order to catch any foreign objects which may have been accidently dropped onto the rolls and have passed therethrough by the ability of the spring-loaded roll 163 to be moved away from roll 162. The form of the screen 174a enables such objects to be retained thereon and withdrawn from the housing enclosing the rolls.

The fully reduced material, which may be, for instance, of $\frac{1}{16}$ inch grain size, may be collected in a hopper arranged under the lump breaker and fitted with any suitable delivery means. However, it is frequently desired to mix granular products in definite proportions or to blend different lots into one batch and delivery means enabling this to be carried out are shown in FIGURES 15, 17, and 18, in which a hopper 174 receiving the broken-up material from the lump breaker is provided with a pivoted spout 175 by which the material may be delivered to any one of a plurality of compartments 176. The spout 175 is mounted on a shaft 177 and may be swung about this shaft and positioned by a lever 178, secured on shaft 177, and provided with a detent arrangement 179 and quadrant 179a marked with the number of compartments with any of which the spout may be brought into registration.

It is to be understood that the broken-up material may be delivered to a delivery container forming part of the hopper indicated in FIGURE 1 and divided by transverse partitions into a plurality of compartments in place of the separate compartments shown in FIGURE 15 and from which the material is delivered to the star feed.

The material from each compartment is delivered by gravity from the compartments into the hopper and feed and mixed thereby as it is delivered into a stream of air, carrying it forward for any further steps of a process required and for collection.

The result of this method of operation is to obtain a thorough blending of the material with a minimum height of hopper since the usual mixing helices in the receiving hopper are not required.

FIGURE 16 shows one of the liners 180 which are positioned closely spaced inwardly of each side wall 156 carrying the bearings of the various shafts and in air-tight relation therewith and forming air space 180a. The arcuate slot in the liner corresponding to the arcuate slot 163a in the sides 156 is closed by a disk 181 mounted on the shaft of the swinging roll and having a diameter large enough to cover the slot in any position of roll 163, and an inwardly projecting flange 182 is mounted on the inner side of the liner to prevent dust from working between the disk and liner.

Pressure air moving from the space enclosed by casing 183 through shaft slot and around disk 181 and flange 182 toward the inside of the lump breaker, effectively prevents dust from entering casing 183.

The air-tight casing 183 is mounted on the outer side walls 156 to enclose the driving gears and bearings in which the various shafts are mounted, the casing structure at one side being extended to enclose the belt drive from an explosion-proof electric motor to the belt pulley 185.

Air under moderate pressure is fed into casing 183 and air space 180a through piping 186.

OPERATION

The operation of the installation will be described, by way of example only, as applied to the treatment of ammonium perchlorate for the reason that equipment which successfully processes this material can handle any other granular material and may be readily adapted if necessary to take care of any special process step required.

The general purpose of the installation is to provide maximum automation for a substantial output of processed material. As applied to the treatment of ammonium perchlorate, the installation provided three times the output with one-third the number of operatives as compared with the best equipment available previous to the present invention.

The ammonium perchlorate is stored in 250-lb. barrels and is processed in batches which may vary in number of barrels required, and in addition each batch may require the blending of a particular number of barrels of different process lots to secure a uniform end product.

The material when stored tends to set up in lumps of varying size and may even set up solid, whereas a maximum grain size of $\frac{1}{16}$ inch is required in the end product. The barrels required for each batch are placed on the slightly inclined floor at the foot of the barrel hoist which is then put in operation, and are raised to the elevated track at the top of the hoist. The removable stop is in position on the elevated track and the barrels are successively pushed onto the track by the lifting arms of the elevator carriages until the whole batch has been accumulated. This procedure obviates any difficulty due to a barrel or barrels being left on the barrel hoist when it is switched off, resulting in the barrel hoist running backward and the barrels crashing onto the floor. The barrel stop is then removed.

One operator then takes position before the controls of the lump breaker while another takes position on a grating floor, in which position he can remove the covers from the barrels as they are fed one at a time and given a preliminary backward tilt by the barrel receiving frame of the lump breaking machine.

The operator at the controls has before him the valves shown in FIGURES 10 through 13 and the foot pedal operating the barrel feed shown in FIGURES 6, 7, 8 and 9. The operator first depresses the foot pedal 84 and the end 81 of lever 79, thus freeing the first barrel to roll into the barrel dumper, the parts of which will be in the position shown in FIGURE 10.

The valves operating the barrel dumper as shown in FIGURE 10 are in order from the left of the figure; the barrel clamp valve 119, valve 121 operating the tilt cylinder 95, electromagnetic valve 125, the circuit of which is closed by normally open push-button switch 126 so long as it is kept closed, and switch 127 automatically operated by arm 128.

In the rest position shown in FIGURE 10, the clamp operating valve 119 will be in position to hold the clamping cylinder in raised position, tilt valve 121 will be "Ho" position, indicating that the barrel receiving frame is in horizontal barrel receiving position, in which the piston rod of cylinder 96 is in extended position and the piston rod of cylinder 100 is in the retracted position. Push button switch 126 is in open position and switch 127 is inoperative since the circuit throughout it is broken at normally open push-button switch 126.

Figure 11:
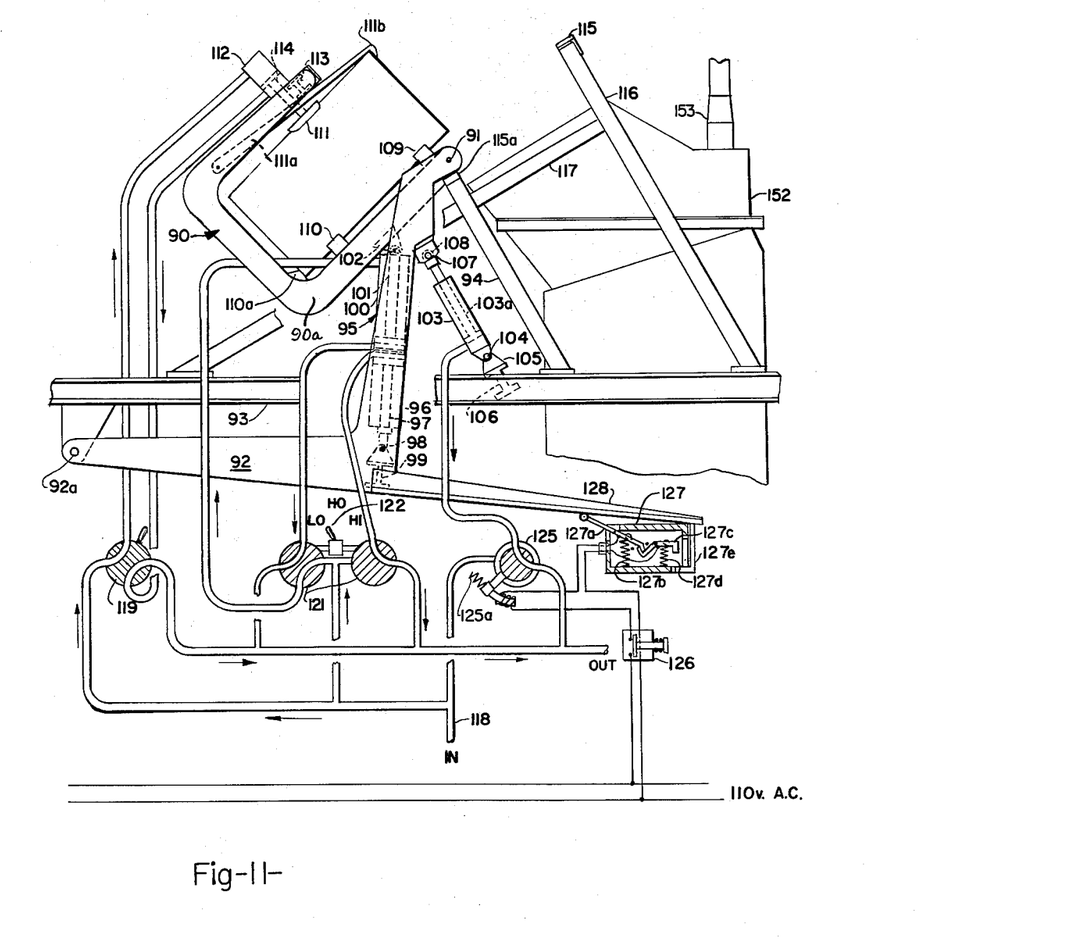
FIGURE 11 is a view similar to that of FIGURE 10 showing the first movement of the barrel dumping and jolting device.

The operator moves valve handle 122 to the "Lo" position shown in FIGURE 11. The indicated flow of the operating air will enable the piston of cylinder 96 to be retracted under the weight of the parts into the cylinder by exhaust of air from cylinder 96, and the barrel receiving frame will tilt back to a position in which the lid or cover of the barrel may be removed and the barrel is positioned against the barrel stop 110a on the inner end of the barrel receiving frame. If the barrel is fitted with impervious lining or silica gel bags, the latter are removed and the top of the lining is folded back over the edge and is taped in place with adhesive tape. The cover of the barrel is put within reach of the operator, who will dispose of the empty barrels. The operator then moves handle 120 to supply operating air to force the clamp 111 downwardly which also brings the edge clamp 111b into operation. This operation could obviously be made automatic by the barrel rolling against a switch operating an electromagnetic valve for the clamping cylinder.

The operator then moves valve handle 122 to "Hi" position, and the flow of the operating air indicated in FIGURE 12 causes extension of the pistons of both cylinders 96 and 100 and the barrel receiving frame to tilt the barrel into discharge position. It will be noted that during the movement of the barrel receiving frame switch 126 has not been operated and therefore no change has taken place in the position of the jolter frame 92.

If the barrel has been completely emptied of its contents, the barrel receiving frame is returned to horizontal position, but it will often be necessary to jolt the barrel to free lumps of material.

To cause the jolting action, the operator presses button switch 126 as shown in FIGURE 13 which will put limit switch 127 in the circuit and energizes the solenoid of the control valve 125 of the jolt cylinder 103 which valve had previously kept the jolt cylinder connected to the exhaust line, and connects the cylinder 103 to the pressure air line. The piston of the cylinder is therefore extended, raising the free end of the barrel frame from the end of struts 116 and 94 by raising jolt frame 92 to the free end of which the barrel receiving frame is pivoted, until arm 128 opens the contacts in switch 127 thus deenergizing the solenoid of valve 125 and connecting the jolt cylinder 103 to the exhaust line thus causing the jolt frame to drop and the barrel receiving frame to strike the top of struts 116 and 94. In this lowered position, the arm 128 will again close switch 127 provided that the switch 126 is kept closed by finger pressure so that jolting will continue as long as desired. When the jolting action has resulted in completely emptying the barrel, the operator returns the valve handle 122 to the "Ho" position which will return the barrel receiving frame to the horizontal position, then moves the handle 120 of the clamping cylinder valve 119 to release the clamp 111 and edge clamp 111a. The other operator then lifts out the empty barrel, replaces the lid and rolls the barrel out to the descender which automatically delivers the barrel to the empty barrel storage floor.

The spring load in the breaker rolls is adjusted so that the pressure will not be excessive, but light. Such light pressure applied to a lump separates all grains from each other. Spring loading is also required to permit solid foreign bodies such as bolts and nuts to pass through the rolls without damage to the rolls or jamming and stopping the rolls. Crushing of the material is not desired, since an increase of fines smaller than 1/16 inch does not conform with specifications for this material. The result intended is to break up agglomerations or adhesions between originally free grains all of approximately 1/16 inch size.

The material falling out of the barrels and of a size too large to pass breaker bars 158 of the lump breaker are caught in the angle of the breaker bars and are rapidly reduced in size and pass between the reducing rolls while fines not caught by the breaker bars of the lump breaker pass directly to the blending hopper. Lumps too big to pass the toothed disks 157 of the lump breaker will rest on top of the toothed disks which, however, will rapidly break away the lower portion of the lumps until the whole has been broken up. This action will take place even if the lump is as large as the capacity of the barrel.

The contents of a barrel will be broken up in about one minute. As the ground material falls into the hopper under the lump breaker, the operator delivers it as may be required into the various individual compartments of the blending hopper by operating the lever swinging the delivery spout of the hopper as may be required.

We claim:
1. A lump breaker of the class described comprising in combination a housing, a bank of disks in spaced parallel relationship mounted in the housing, means for rotating said disks, each disk having a plurality of teeth, said teeth being hook-shaped and terminating in a piercing point, a plurality of inclined breaker bars, said breaker bars being in spaced parallel relationship to each other, the teeth of each disk rotating in the spaces between the parallel breaker bars, a pair of crushing rollers in vertically spaced relationship beneath the teeth of the disks, one of said crushing rollers being mounted on a fixed axis and the other crushing roller being resiliently mounted, the periphery of said rollers being corrugated and shaped so the corrugations mesh with each other whereby the space between the corrugated surfaces is maintained constant, and a filter mounted in vertically spaced relationship beneath the crushing rollers to prevent particles of an improper size which pass through the rollers from entering a loading container.

2. The apparatus described in claim 1 including scraper plates, said scraper plates being positioned to bear against the periphery of the crushing rollers for scraping off material adhering thereto.

3. The apparatus described in claim 2 including an adjustably mounted outlet nozzle, and a plurality of separate receiving containers associated with said outlet nozzle whereby pulverized material can be selectively directed into predetermined receiving containers.

References Cited by the Examiner

UNITED STATES PATENTS

| | | | |
|---|---|---|---|
| 1,014,818 | 1/1912 | Edison | 241—101 |
| 1,793,062 | 2/1931 | Collier | 198—158 |
| 2,235,968 | 3/1941 | Thurman | 241—224 |
| 2,244,050 | 6/1941 | Cassiere | 302—49 |
| 2,293,871 | 8/1942 | Whitfield | 302—49 |
| 2,365,782 | 12/1944 | Stevenson | 198—158 |
| 2,435,030 | 1/1948 | Brady | 241—222 |
| 2,659,537 | 11/1953 | Keon | 241—222 |
| 2,799,413 | 7/1957 | Innocenti | 214—302 |
| 2,865,571 | 12/1958 | Ferdon | 241—157 |
| 2,873,921 | 2/1959 | Christiansen | 241—157 |
| 3,035,725 | 5/1962 | Beaman et al. | 214—302 |

WILLIAM W. DYER, JR., *Primary Examiner.*

GERALD M. FORLENZA, J. SPENCER OVERHOLSER, *Examiners.*